US007932810B2

(12) United States Patent
Gartner

(10) Patent No.: US 7,932,810 B2
(45) Date of Patent: Apr. 26, 2011

(54) TOP READING KEYPAD ASSEMBLY AND METHOD OF INPUTTING AN ACCESS COMBINATION

(75) Inventor: Klaus W. Gartner, Palos Verdes Estates, CA (US)

(73) Assignee: Klaus W. Gartner, Palos Verdes Estates, CA (US)

( * ) Notice: Subject to any disclaimer, the term of this patent is extended or adjusted under 35 U.S.C. 154(b) by 887 days.

(21) Appl. No.: 11/858,198

(22) Filed: Sep. 20, 2007

(65) Prior Publication Data

US 2009/0078008 A1 Mar. 26, 2009

(51) Int. Cl.

| | |
|---|---|
| ***G05B 19/00*** | (2006.01) |
| ***G05B 23/00*** | (2006.01) |
| ***H04M 1/00*** | (2006.01) |
| ***E05B 47/00*** | (2006.01) |

(52) U.S. Cl. ............ 340/5.2; 340/5.1; 340/5.9; 340/5.5; 340/5.6; 340/5.73; 340/5.64; 70/277; 341/22; 341/33; 341/35; 345/168; 345/184

(58) Field of Classification Search .................. 340/5.5, 340/5.1, 5.6, 5.73, 5.64, 5.9, 5.26, 5.54, 5.55, 340/5.85, 5.2; 70/278.1, 278.4, 286; 341/35, 341/22, 33; 345/168, 184; 700/17, 83–85
See application file for complete search history.

(56) References Cited

U.S. PATENT DOCUMENTS

| | | | | |
|---|---|---|---|---|
| 4,502,048 | A | 2/1985 | Rehm | |
| 5,604,489 | A * | 2/1997 | Hyatt, Jr. | 340/5.55 |
| 6,209,102 | B1 | 3/2001 | Hoover | |

OTHER PUBLICATIONS

ADEL LOCKS USA, Trinity 788 Operation Manual, Aug. 20, 2006.*

* cited by examiner

*Primary Examiner* — Benjamin C Lee
*Assistant Examiner* — Omeed Alizada
(74) *Attorney, Agent, or Firm* — Barbara A. Wrigley; Oppenheimer, Wolff & Donnelly, LLP

(57) ABSTRACT

A method of inputting a user input access combination in order to gain authorized entry into a secure location comprises providing an input device having first and second input keys as well as a display, randomly generating a first character and a second character on the display, inputting the user input access combination into the input device, and comparing the user input access combination with an authorized access combination. The user input access combination includes a first user input character and a second user input character. The step of inputting the user input access combination comprises pressing the first input key to change the first randomly generated character to the first user input character, and pressing the second input key to change the second randomly generated character to the second user input character.

18 Claims, 5 Drawing Sheets

TOP READING KEYPAD ASSEMBLY AND METHOD OF INPUTTING AN ACCESS COMBINATION

BACKGROUND OF THE INVENTION

1. Field of the Invention

The present invention relates to keypad assemblies and methods of inputting lock combinations, primarily for safes and other secure containers.

2. Description of the Related Art

Safes and other secure containers have traditionally used combination locks for controlling and authorizing entry. Locks had been mechanical and relied on a person dialing a correct combination on a rotating dial. The rotation positioned mechanical elements within the lock such that dialing the correct combination allowed a locking bolt to release the container door. For example, traditional mechanical locks, such as Gartner, U.S. Pat. No. 3,968,667 (1976), rely on a dial rotating tumblers. Proper dial rotation aligns gates in the tumblers. Once the gates are aligned, a fence on a fence lever can enter the aligned gates. Continued rotation of the dial and tumblers pulls the fence lever and withdraws the bolt.

Electronics have replaced mechanical structures in many locks. Electronic locks can use electronics rather than aligned tumbler wheels to sense entry of the correct combination. The electronics can sense the rotary position of a combination lock dial, or a keypad can replace the combination dial. Consequently, instead of dialing a number, e.g., "72," the user would first push the "7" and then the "2" keys for the same result. Uyeda, U.S. Pat. No. 5,134,870 (1992) and Gartner, U.S. Pat. No. 5,136,870 (1992) are examples of a keypad entry system for a safe and door lock, respectively.

When the lock is used to secure entry to a container, the electronic components are typically mounted on a housing inside the container door. The housing contains a battery and a circuit board, which contains the electronic circuitry controlling the lock. The keypad is on the outside of the housing so as to be accessible to the user. A cable typically extends between the keypad and the circuit board for transmitting signals between the two components.

Generally, the keypad is on the outside of the keypad housing and parallel to the safe or container wall. Thus, it usually is in a vertical plane. Often, the user's eyes are higher than the keypad so he or she looks down and at an angle to the keypad. Accordingly, having a flat keypad with its surface parallel to the door may make the keypad more difficult to see.

Traditional electronic keypads generally include ten keys that correspond with the numbers "0" through "9." One drawback of this type of traditional keypad design arises from the fact that as users repeatedly enter the correct, authorized access combination on the keypad, the keys representing correct numbers in the combination begin to show signs of wear. As a result, in order to reduce the chances that an unauthorized individual may figure out the correct access combination, the combination must periodically be changed such that each of the keys on the keypad are used at some point in time and, as a result, show signs of wear. However, having to periodically change the correct, authorized access combination may create confusion for authorized users who must repeatedly remember new combinations.

Thus, there is a need for an improved access combination system and method that may be easily visualized and accessed by a user. There is a further need for a system and method that reduces the number of input keys required to enter an access combination while maintaining a high level of security.

SUMMARY OF THE INVENTION

The present invention solves the foregoing problems by providing a method of inputting a user input access combination in order to gain authorized entry into a secure location, the method comprising providing an input device having first and second input keys as well as a display, randomly generating a first character and a second character on the display, inputting the user input access combination into the input device, and comparing the user input access combination with an authorized access combination. The user input access combination includes a first user input character and a second user input character. The step of inputting the user input access combination comprises pressing the first input key to change the first randomly generated character to the first user input character, and pressing the second input key to change the second randomly generated character to the second user input character.

The present invention also provides a top reading keypad assembly comprising a housing, a keypad, and a microprocessor in communication with the keypad. The housing includes a front wall, a rear wall, and a generally cylindrical side wall disposed between the front and rear walls. The rear wall of the housing is attachable to a secure container. The keypad is attachable to the side wall of the housing, and includes a display, a first input key, and a second input key. The display includes a first display portion for displaying a first character and a second display portion for displaying a second character. The first input key is configured for changing the first character displayed in the first display portion, while the second input key is configured for changing the second character displayed in the second display portion. The microprocessor is configured to control operation of a latch mechanism, wherein the latch mechanism is movable from a locked position to an unlocked position upon the microprocessor determining that a correct access combination has been input through the keypad.

DETAILED DESCRIPTION OF THE INVENTION

Figure 1:
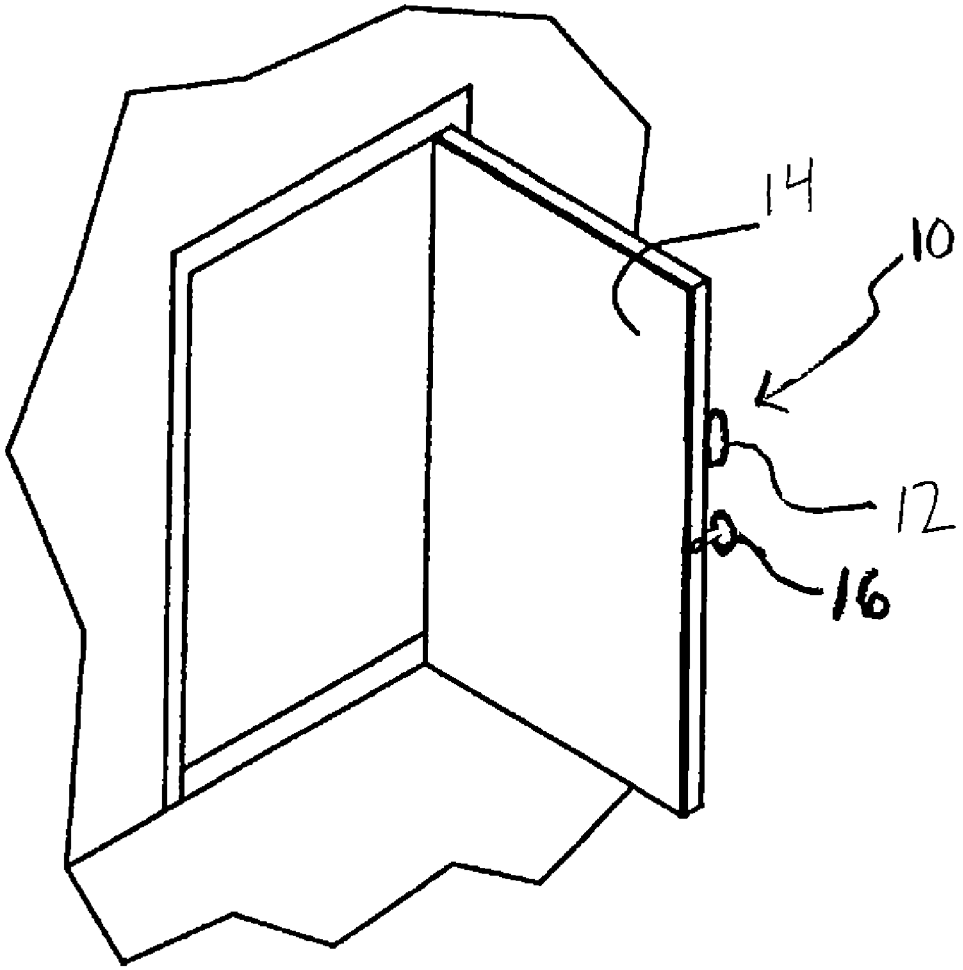
FIG. 1 is a pictorial view of an electromechanical lock and keypad assembly according to the present invention illustrating the keypad assembly affixed to a door of a safe.
Figure 2:
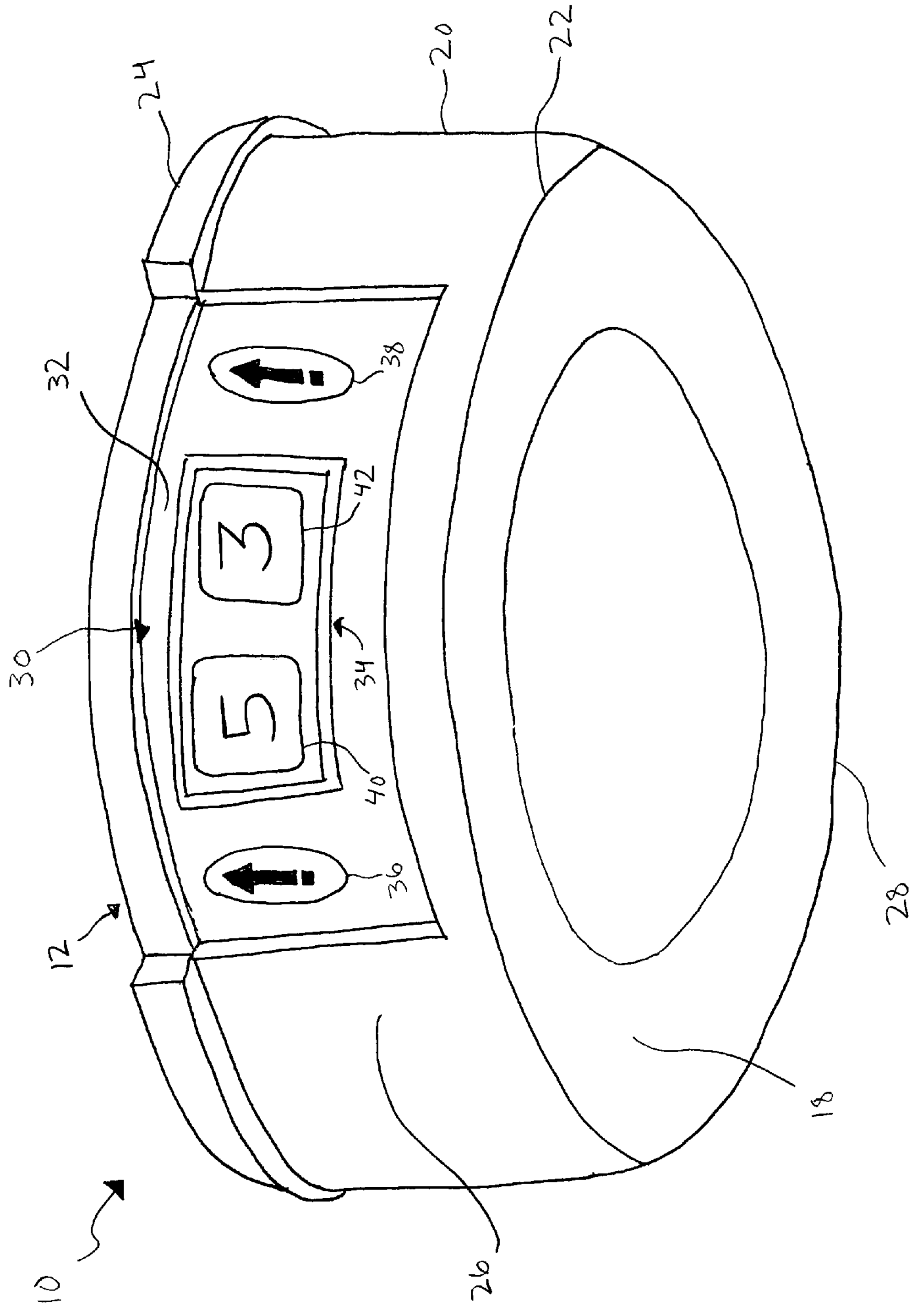
FIG. 2 is a front perspective view of one embodiment of a top reading input keypad assembly according to the present invention.

Referring now to the drawings, and more particularly to FIGS. 1 and 2 thereof, there is shown a top reading keypad assembly 10 which is constructed and configured to operate in accordance with the present invention. Keypad assembly 10 generally comprises housing 12 which is adapted to be mounted to an outside of door 14 by means not shown. Door 14 includes door handle 16, which may be grasped and turned for opening door 14 when a latch or similar device is retracted from a closed position to an open position as will be explained in more detail to follow.

As shown in FIG. 2, housing 12 includes front wall 18, side wall 20, front edge 22, rear edge 24, top portion 26 of housing 12, bottom portion 28 of housing 12, recessed portion 30, and keypad 32. Side wall 20 is generally cylindrical in shape, although numerous other shapes are also contemplated. Front edge 22 may have a chamfer or rounded surface between front wall 18 and side wall 20 to avert a sharp edge at the intersection of the walls.

Keypad 32 is configured to be disposed within recessed portion 30 of housing 12. Thus, when top reading keypad assembly 10 is coupled to door 14, keypad 32 may be positioned to face upward in a generally horizontal plane relative to door 14, which is in a generally vertical plane, such that a user standing next to door 14 is able to look down toward housing 12 and easily view and have access to keypad 32. As illustrated in FIG. 2, keypad 32 includes display 34, first key 36, and second key 38. Display 34 includes first display portion 40 for displaying a first character, and second display portion 42 for displaying a second character. First and second display portions 40 and 42 may each be configured to display, for example, numerical values between "0" and "9." As shown in FIG. 2, first display portion 40 is displaying the number "5," while second display portion 42 is displaying the number "3." In other embodiments, first and second display portions 40 and 42 may be configured to display a different range of numerical values or, alternatively, letters, symbols, or many other types of characters.

First and second keys 36 and 38 are sealed and covered with flexible material, and pressing one of the keys makes electrical contact within the key. In addition, first and second keys 36 and 38 both include an "arrow" symbol to indicate that pressing the keys will cause an increase or change in the numerical value or other character displayed in first and second display portions 40 and 42. However, such a symbol is not necessary and may be removed from first and second keys 36 and 38. Alternatively, other symbols or characters may replace the arrow symbol such as, for example, a "plus" sign.

Housing 12 of top reading keypad assembly 10 may be constructed from numerous materials. However, the material will typically be a metal, such as brass or stainless steel, but can also be plastic. Furthermore, the outer surfaces of housing 12 may be chrome-plated or painted, or the unplated metal surface can be polished or brushed for aesthetics. Casting may be a preferred way of forming the housing.

Figure 3:
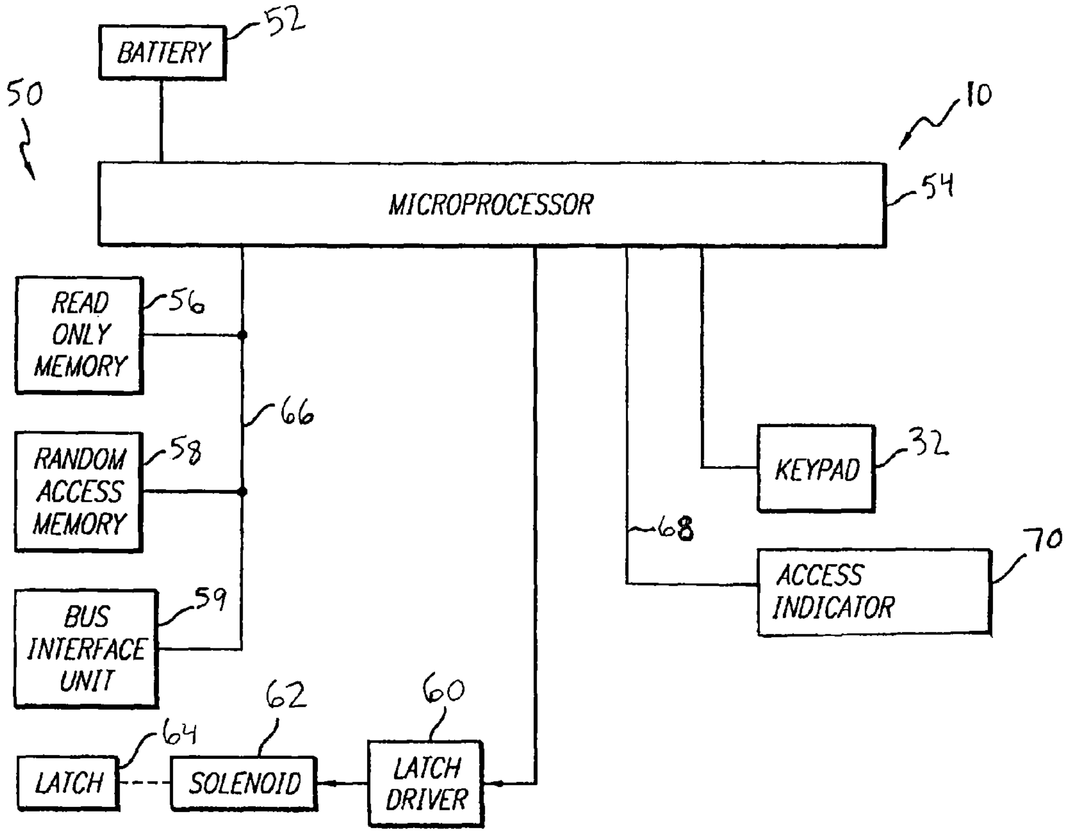
FIG. 3 is a block diagram of the various components of the keypad assembly of FIG. 2.

FIG. 3 illustrates a block diagram of keypad assembly 10 detailing various control components and the data communication between those components. In particular, as shown in FIG. 3, keypad assembly 10 is controlled by electronic logic circuit 50, which is powered by battery 52. Logic circuit 50 generally includes microprocessor 54, read only memory (ROM) 56, random access memory (RAM) 58, interface unit 59, latch driver 60, and solenoid 62. Logic circuit 50 is responsive to a coded input signal entered via keypad 32 mounted to housing 12. In particular, logic circuit 50 causes a solenoid plunger or latch 64 to move between closed and open positions when the coded input signal is received via a user entering a correct access combination from keypad 32.

The ROM 56 has at least one correct access combination stored therein which must be retrieved for comparison purposes with the access combination entered by the user via keypad 32. The RAM 58 is coupled between microprocessor 54 and interface unit 59 via a common data bus 66, and is configured for receiving and storing the user input access combination.

In order to enable microprocessor 54 to control operation of latch 64, latch driver 60 is coupled between microprocessor 54 and solenoid 62. Solenoid 62 is configured to move latch 64 between closed and open positions whenever microprocessor 54 sends an actuation signal to latch driver 60. The operation of latch driver 60 and solenoid 62 is known to those skilled in the art and such operation will not be described in greater detail. In one embodiment, latch driver 60 is a solenoid driver. However, it is contemplated that other types and kinds of driver, such as a motor driver, may be employed.

In one embodiment of keypad assembly 10, whenever the user enters the correct access combination, microprocessor 54 will generate a pulsed correct indication signal on conductor path 68 that causes an access indicator 70 to indicate that the correct access combination has been entered. Similarly, whenever the user enters an incorrect access combination via keypad 32, microprocessor 54 will generate a pulsed incorrect indication signal on conduction path 68 that causes access indicator 70 to indicate that an incorrect access combination has been entered. It is contemplated that access indicator 70 may include any number of indicating means known in the art such as, for example, sound, light, or other visual-type indicators. In other embodiments, keypad assembly 10 does not include an access indicator, and the user simply attempts to open door 14 after entering the access combination. In that case, when the user enters the correct access combination, latch 64 will retract to the open position, thereby allowing the user to open door 14. However, if the user input access combination does not match the correct access combination, latch 64 will remain in the closed position, and the user will be unable to open door 14.

In one embodiment of keypad assembly 10, when latch 64 is actuated to the open position, latch 64 remains retracted for a sufficient period of time to permit the user to open door 14 but not a sufficient period of time to permit the user to lock door 14 once it has been opened. In that case, the user must reenter the correct access combination to enable door 14 to be once again locked in a closed position. However, in other embodiments, the above-mentioned period of time may be adjusted such that opening and closing door 14 may be accomplished by entering the correct access combination only once.

It is also contemplated that latch 64 may be in a normally open position instead of a normally closed position. Thus, the operation to cause latch 64 to be extended to the closed position for locking door 14 may be accomplished in substantially the same manner as described above for causing latch 64 to be retracted to the open position for unlocking door 14.

Figure 4:
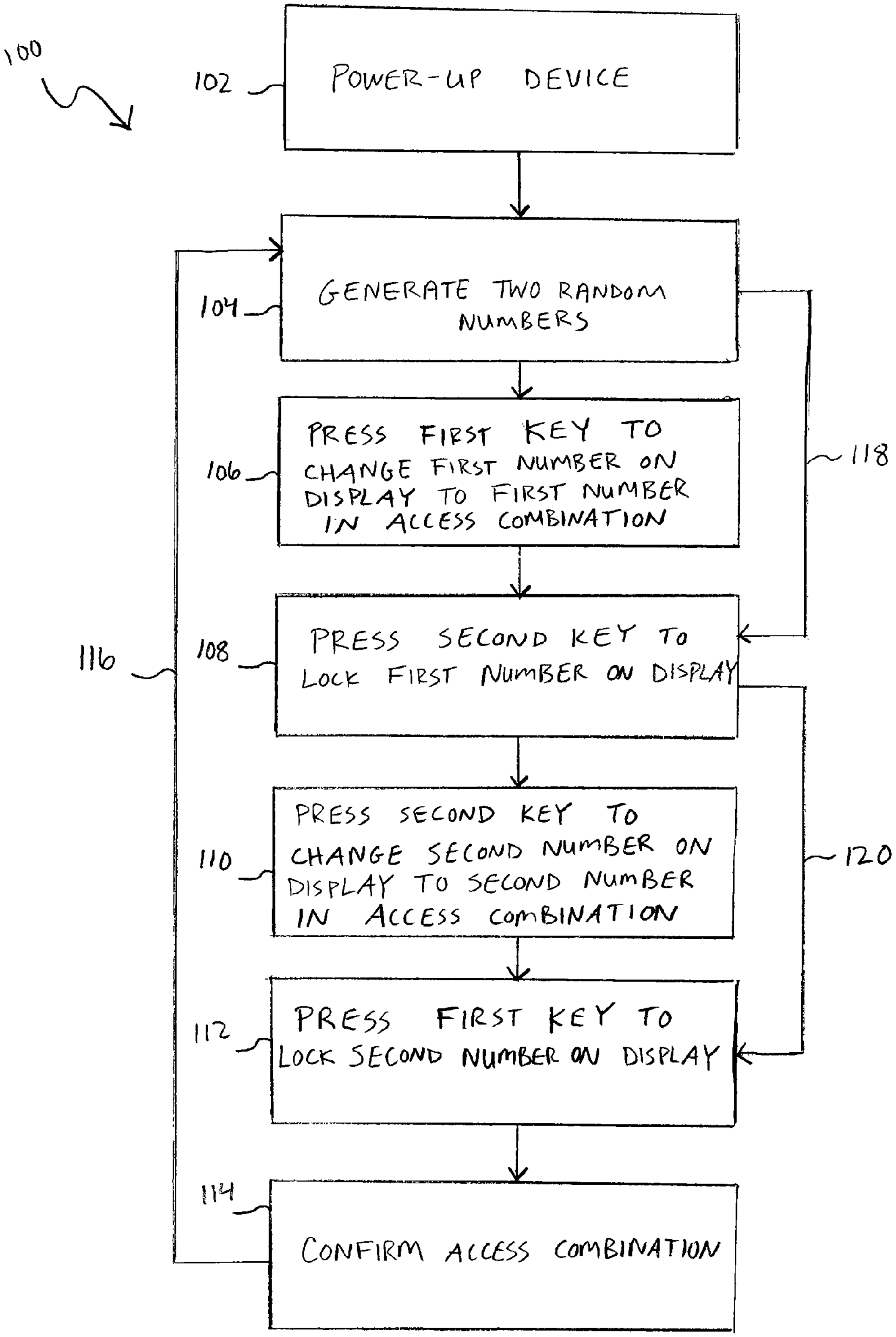
FIG. 4 is a flowchart of one embodiment of an input method for a keypad input device according to the present invention.

Now that a brief description of a top reading keypad assembly has been provided, one embodiment of a method of input for a top reading keypad according to the present invention will be described in detail. In particular, FIG. 4 illustrates a flowchart of a sample control logic sequence of an input method 100 according to the present invention. In particular, input method 100 will be described with reference to top reading keypad assembly 10, although one skilled in the art will appreciate that input method 100 may be utilized in conjunction with keypads other than top reading keypad assembly 10 such as, for example, keypads placed on a front surface of a keypad assembly.

Figure 5A:
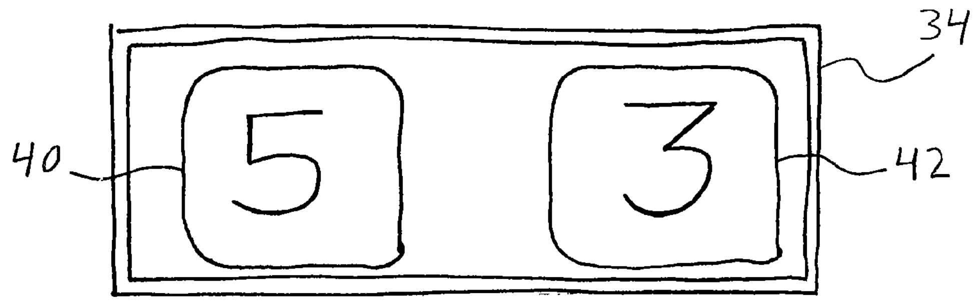
FIGS. 5A-5C are diagrams illustrating a display of the keypad assembly of FIG. 2 displaying the output at various steps throughout the input method.

The sequence begins at step 102 when either first key 36 or second key 38 is pressed to power-up keypad assembly 10. In particular, powering-up key pad assembly 10 activates and turns on display 34. As a result, in step 104, two randomly generated numbers between "0" and "9" are shown on display 34. For example, the randomly generated numbers may include the number "5" displayed in first display portion 40 and the number "3" displayed in second display portion 42 as illustrated in FIG. 5A.

Figure 5B:
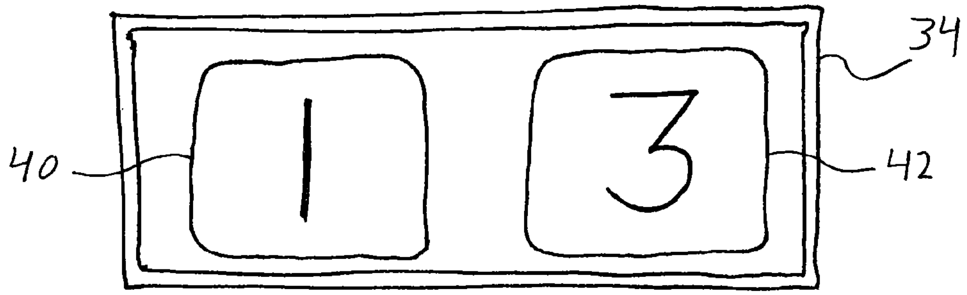

Next, in step 106, the user presses first key 36 in order to change the numerical value displayed in first display portion 40 to the first number in the correct access combination. In particular, momentarily pressing first key 36 causes the number displayed in first display portion 40 to increase with each actuation of first key 36, while pressing first key 36 in a continuous manner causes first display portion 40 to scroll through the numbers sequentially until the number "9" is reached, at which point first display portion 40 will begin counting up once again beginning with "0." Thus, the user may repeatedly press first key 36 until the desired number is displayed on first display portion 40, or the user may press and hold first key 36 until the desired number appears on first display portion 40, at which point the user may cease pressing first key 36 such that the desired number remains displayed in first display portion 40. For example, if the first number in the combination is "1," the user may change the number displayed in first display portion 40 by either of the above methods until the number "1" appears. At that point, display 34 will display the number "1" in first display portion 40 and the number "3" in second display portion 42 as illustrated in FIG. 5B. One skilled in the art will appreciate that, in other embodiments, actuating first key 36 may alternatively result in the numerical value decreasing with each actuation of first key 36 in order to "count down" instead of "counting up."

Next, in step 108, the user then presses second key 38 to lock the number "1" into first display portion 40 such that the user may not go back and modify the first combination number selected in step 106 above. Pressing second key 38 stores the number selected by the user in RAM 58. In other embodiments, the user may have the option of changing the first number selected in step 106 by, for example, pressing first key 36 again to scroll through and select a different number.

Figure 5C:
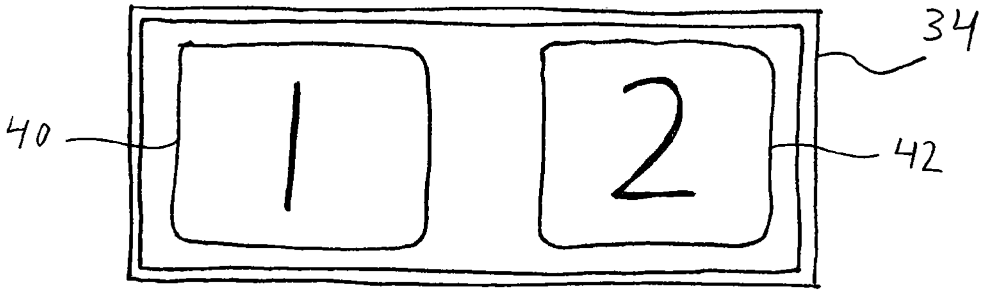

The method continues at step 110 where the user scrolls through the numbers displayed in second display portion 42 by pressing second key 38 until the second number in the combination is displayed. As discussed above, the user may scroll through the numbers either by repeatedly pressing second key 38 or by continuously pressing and holding second key 38. For example, if the second number in the correct access combination is "2," the user may change the number displayed in second display portion 42 until the number "2" appears. At that point, display 34 will display the number "1" in first display portion 40 and the number "2" in second display portion 42 as illustrated in FIG. 5C. Once the second number in the access combination is input by the user and displayed in second display portion 42, the user may then press first key 36 in step 112 in order to lock the number "2" in second display portion 42 and to store the number in RAM 58.

Next, in step 114, microprocessor 54 compares the user input access combination stored in RAM 58 with the correct access combination stored in ROM 56 to determine if the combinations match. If the user input access combination matches the correct access combination, microprocessor 54 sends a signal to latch drive 60 indicating that authorized entry has been confirmed, thereby retracting or otherwise moving latch 64 to the open position in order to allow the user to open door 14.

Although method 100 has been described with reference to a display configured to display only two numbers, one skilled in the art will appreciate that the input method according to the present invention may be modified for use with a display that may be configured to display any quantity of numbers, letters, symbols, or other characters. In one embodiment, the correct access combination is formed by two numbers. In other embodiments, the correct access combination is formed by more than two numbers. Furthermore, the total quantity of numbers that form the correct access combination may be either odd or even. In addition, if the correct access combination is of a length such that more than two numbers must be entered by the user, method 100 may include control loop 116 as illustrated in FIG. 4. In step 116, microprocessor 54 determines if the user has entered a total quantity of access combination numbers equal to the total quantity of combination numbers in the correct access combination. If microprocessor 54 determines that additional access combination numbers must be entered, method 100 enters control loop 116, which causes the input method to return to step 104 where one or more additional random numbers are generated on display 34. Microprocessor 54 will continue to run through control loop 116 of input method 100 until microprocessor 54 determines that the user has entered the correct quantity of combination numbers in the correct access combination.

Input method 100 may also include bypass steps 118 and 120. If, for example, the first randomly generated number happens to coincide with the first number of the correct access combination, bypass 118 allows the user to simply press second key 38 (step 108) to lock the number into first display portion 40. Similarly if the second randomly generated number happens to coincide with the second number of the correct access combination, bypass 120 allows the user to simply press first key 36 (step 112) to lock the number into second display portion 42. Furthermore, if both of the randomly generated numbers happen to coincide with the first (or only) two numbers of the correct access combination, the user may simply press second key 38 (bypass 118) followed directly by first key 36 (bypass 120), which locks the first and second randomly generated numbers into first and second display portions 40 and 42, respectively.

Although the present invention has been described with reference to preferred embodiments, workers skilled in the art will recognize that changes may be made in form and detail without departing from the spirit and scope of the invention.

What is claimed is:

1. A method of inputting a user input access combination in order to gain authorized entry into a secure location, the method comprising:

providing an input device having a first input key, a second input key, and a display;

randomly generating a first character and a second character, the first character being displayed on a first display portion and the second character being displayed on a second display portion;

inputting the user input access combination into the input device, the user input access combination including a first user input character and a second user input character selected from a character set, wherein inputting the user input access combination comprises:

pressing the first input key to change the first randomly generated character to the first user input character, wherein pressing and holding the first input key causes the first display portion to continuously scroll through the character set and pressing the first input key at discrete instances causes the first display portion to step through the character set sequentially;

pressing the second input key to lock the first user input character in the first display portion and store the first user input character in temporary memory;

pressing the second input key to change the second randomly generated character to the second user input character, wherein pressing and holding the second input key causes the second display portion to continuously scroll through the character set and pressing the second input key at discrete instances causes the second display portion to step through the character set sequentially; and pressing the first input key to lock the second user input character in the second display portion and store the second user input character in the temporary memory; and comparing the user input access combination with an authorized access combination.

2. The method of claim 1, wherein the first and second randomly generated characters and the first and second user input characters are alphanumeric characters.

3. The method of claim 2, wherein the alphanumeric characters are numbers.

4. The method of claim 1, further comprising the step of moving a latch mechanism from a locked position to an unlocked position upon confirming that the user input access combination matches the authorized access combination.

5. The method of claim 1, wherein the temporary memory is random access memory.

6. The method of claim 5, further comprising the step of storing the authorized access combination in read only memory.

7. A top reading keypad assembly comprising:

a housing having a front wall, a rear wall, and a generally cylindrical side wall disposed between the front and rear walls, wherein the rear wall is attachable to a secure container;

a keypad attachable to the side wall of the housing in a generally horizontal plane, the keypad comprising:

a display having first and second display portions for displaying first and second characters from a character set;

a first input key for changing the first character displayed in the first display portion, wherein pressing and holding the first input key causes the first display portion to continuously scroll through the character set and pressing the first input key at discrete instances causes the first display portion to step through the character set sequentially, the first input key including a first arrow indicator thereon that indicates the direction of sequential change in the character set; and a second input key for changing the second character displayed in the second display portion, wherein pressing and holding the second input key causes the second display portion to continuously scroll through the character set and pressing the second input key at discrete instances causes the second display portion to step through the character set sequentially, the second input key including a second arrow indicator thereon that indicates the direction of sequential change in the character set;

wherein a first user input character may be locked in the first display portion and stored in temporary memory by pressing the second input key; and wherein a second user input character may be locked in the second display portion and stored in temporary memory by pressing the first input key; and a microprocessor in communication with the keypad and configured to control operation of a latch mechanism, wherein the latch mechanism is movable from a locked position to an unlocked position upon the microprocessor determining that a correct access combination has been input through the keypad, the latch mechanism being actuatable between the locked and unlocked positions using a solenoid driver.

8. The top reading keypad assembly of claim 7, wherein the first and second characters are alphanumeric characters.

9. The top reading keypad assembly of claim 8, wherein the alphanumeric characters are numbers.

10. The top reading keypad assembly of claim 9, wherein the numbers are integers in a range from 0 through 9.

11. The top reading keypad assembly of claim 7, further comprising an access indicator for indicating whether the correct access combination has been input through the keypad.

12. The top reading keypad assembly of claim 11, wherein the access indicator comprises a light source.

13. The top reading keypad assembly of claim 11, wherein the access indicator comprises an audible indicating means.

14. The top reading keypad assembly of claim 7, further comprising a memory element for storing the correct access combination.

15. The top reading keypad assembly of claim 7, wherein the keypad is recessed within the side wall of the housing.

16. A method of inputting a user input access combination in order to gain authorized entry into a secure location, the method comprising:

providing an input device having a first input key, a second input key, and a display;

randomly generating a first number and a second number, the first number being displayed on a first display portion and the second number being displayed on a second display portion;

inputting the user input access combination into the input device, the user input access combination including a first user input number and a second user input number selected from a number set, wherein inputting the user input access combination comprises:

pressing the first input key to change the first randomly generated number to the first user input number, wherein pressing and holding the first input key causes the first display portion to continuously scroll through the number set and pressing the first input key at discrete instances causes the first display portion to step through the number set sequentially, the first input key including a first arrow indicator thereon that indicates the direction of sequential change in the number set;

pressing the second input key to lock the first user input number in the first display portion and store the first user input number in temporary memory;

pressing the second input key to change the second randomly generated number to the second user input number, wherein pressing and holding the second input key causes the second display portion to continuously scroll through the number set and pressing the second input key at discrete instances causes the second display portion to step through the number set sequentially, the second input key including a second arrow indicator thereon that indicates the direction of sequential change in the number set; and pressing the first input key to lock the second user input number in the second display portion and store the second user input number in the temporary memory;

comparing the user input access combination with an authorized access combination; and moving a latch mechanism from a locked position to an unlocked position when the user input access combination matches the authorized access combination, the latch mechanism being actuatable between the locked and unlocked positions using a solenoid driver.

17. The method of claim 16, further comprising the step of storing the authorized access combination in a read only memory element.

18. The method of claim 17, wherein the temporary memory is a random access memory element.

* * * * *